(12) United States Patent
Ernst et al.

(10) Patent No.: US 7,840,070 B2
(45) Date of Patent: Nov. 23, 2010

(54) RENDERING IMAGES BASED ON IMAGE SEGMENTATION

(75) Inventors: Fabian Edgar Ernst, Eindhoven (NL); Peter-Andre Redert, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 867 days.

(21) Appl. No.: 11/718,917

(22) PCT Filed: Nov. 8, 2005

(86) PCT No.: PCT/IB2005/053665
§ 371 (c)(1), (2), (4) Date: May 9, 2007

(87) PCT Pub. No.: WO2006/054200
PCT Pub. Date: May 26, 2006

(65) Prior Publication Data
US 2008/0187222 A1  Aug. 7, 2008

(30) Foreign Application Priority Data
Nov. 16, 2004  (EP) ................... 04105793

(51) Int. Cl.
*G06K 9/34* (2006.01)

(52) U.S. Cl. ...................................................... 382/173
(58) Field of Classification Search ................. 382/128, 382/132–133, 154, 173–180, 199–200, 254, 382/256–259
See application file for complete search history.

(56) References Cited

U.S. PATENT DOCUMENTS 7,689,021 B2 * 3/2010 Shekhar et al. ............. 382/131

* cited by examiner

*Primary Examiner*—Jose L Couso

(57) ABSTRACT

The invention relates to a method for providing rendered images based on image segmentation with determining an edge within the image introduced by boundaries of image segments. To allow shift-based rendering, the invention provides determining an edge within the image introduced by boundaries of image segments, determining an edge region around the edge, determining a first displacement field for the segments, determining a second displacement field for the edge region, merging the first and the second displacement field into a third displacement field having a displacement of the first displacement field for the segments and a displacement of the second displacement field for the edge region, such that the edge region is treated as a separate object with a separate displacement, and shifting the image pixels according to the third displacement field.

16 Claims, 5 Drawing Sheets

RENDERING IMAGES BASED ON IMAGE SEGMENTATION

The invention relates in general to a method and a system for providing rendered images based on image segmentation with determining at least one edge within the image introduced by boundaries of image segments.

For instance, shift-based rendering is used in compression applications as well as in rendering "image+depth" data, such as two and a half dimensional (2.5D) image data on multi-view displays. Shift-based rendering can be applied when new images have to be generated based on existing images, when, for instance, the viewpoint is slightly changed or the time of viewing is slightly later. Image segmentation is also applied, for instance, when motion estimation is used for compressing images. When images are segmented and the segments are shifted, hole filling and edge blurring need to be handled. For shift-based rendering, the original image data is available. In addition, a displacement field, or an equivalent depth map is provided. The displacement field or the depth map determines for each pixel, how far this pixel has to be shifted. However, when shifting pixels, in most cases these are not all shifted by the same value, resulting in the problem of hole filling. Moreover, due to edge blur, segment boundaries cannot always be determined up to the pixel level.

Typically, the displacement field is not the same for all pixels within an image. This difference in the displacement field leads to double occupancies where two pixels are shifted to the same location in the output image, as well as to holes, where within the output image certain locations have no assigned pixel. While double occupancies can be resolved relatively easily, hole filing requires calculating new image data which can be used for the hole.

From R. P. Berretty and F. E. Ernst, "High-quality images from 2.5 D video" Proceedings Eurographics Conference, Granada, Spain, 2003 a method is known, which allows using hidden layer information, such as within 2.5 D image data, for calculating new image data.

Figure 1:
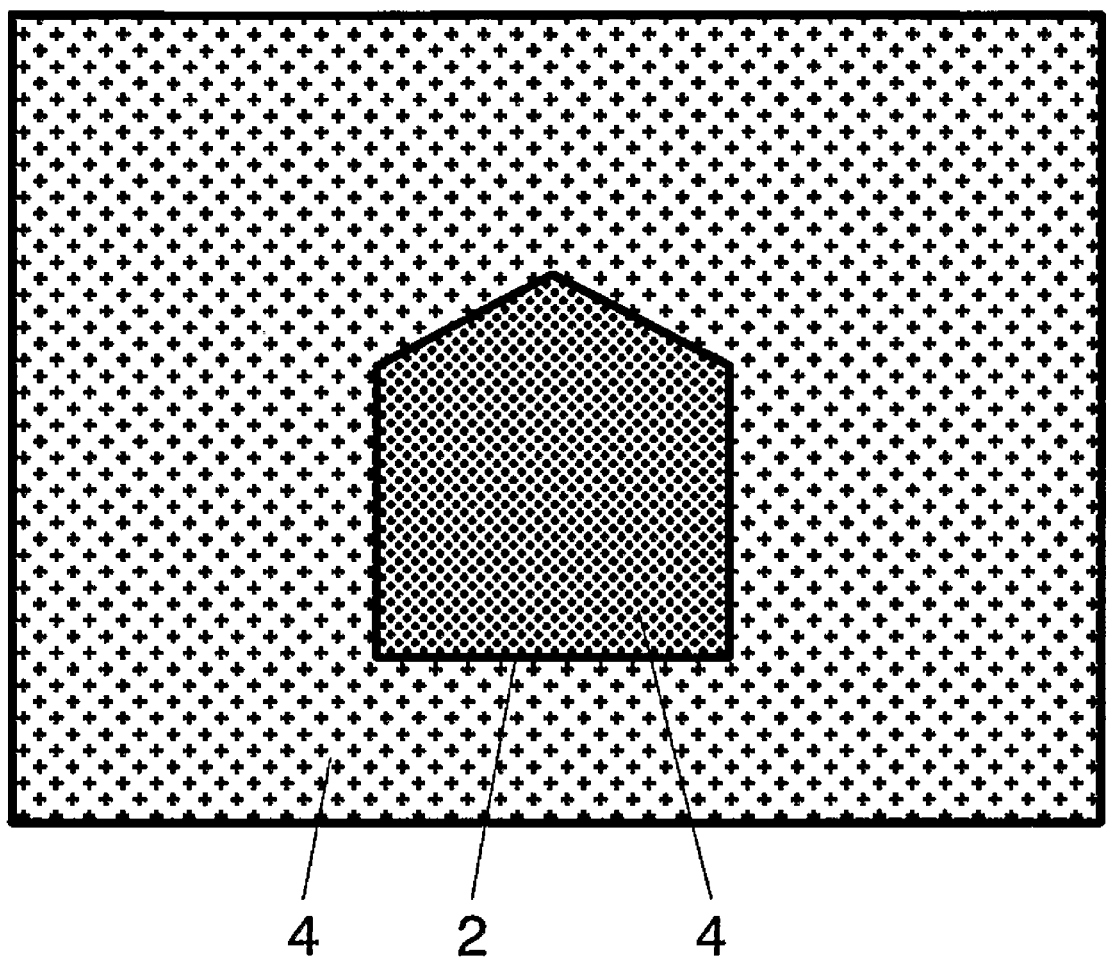

Image segmentation can be based on the fact, that changes in the motion field typically occur at object boundaries, and object boundaries typically coincide with, for instance, color boundaries. A possible image segmentation method can group pixels with a similar color. A possible solution for image segmentation is illustrated in FIG. 1. The solid lines within FIG. 1 represent segment boundaries 2 and the dotted regions are image segments 4. Image segmentation is well known and several methods are available. For instance, one possible segmentation method is known from F. Ernst, P. Wilinski and K. van Overveld: "Dense structure-from-motion: an approach based on segment matching", Proc. European Conference on Computer Vision 2002, Springer Lecture Notes on Computer Science vol. 2531, Copenhagen, pages II-217-II-231.

Shifting pixels of segments differently leads to problems with hole filling. The segment boundaries typically occur at discontinuities, such as color discontinuities. Hence, the interpolation procedure for hole filling needs to be carried out in a region with a lot of variation, for instance, color variation. Additionally, the interpolation often has to be carried out from one side of the boundary, requiring the hole filling algorithm to know what is foreground and what is the background within the image. Additionally, boundaries between objects are blurred over multiple pixels due to the acquisition system. Blurring results in edges, which are not well defined and sharp, but rather washed. Inadequate handling of this blurring in the rendering procedure can lead to ghost edges.

In so far, prior art has the problems of filling holes at object boundaries which coincide with image boundaries with a lot of variation, such as color boundaries. Further, the blur at the object boundaries needs to be handled.

It is an object of the invention to provide a method for segment shifting which overcomes these problems. One further object is to provide a method for segment shifting providing good results even without knowledge of the depth ordering of the object boundaries. Additionally, one further object of the invention is to provide a method for segment shifting without the need of estimating the amount of blurring at the object boundary.

These and other objects are solved by a method for providing rendered images based on image segmentation with determining at least one edge within the image introduced by boundaries of image segments, determining an edge region around the edge, determining a first displacement field for the segments, determining a second displacement field for the edge region, merging the first and the second displacement field into a third displacement field having a displacement of the first displacement field for the segments and a displacement of the second displacement field for at least part of the edge region, such that the edge region is treated as a separate object with a separate displacement, and shifting the image pixels according to the third displacement field.

The inventive method allows easy hole filling procedure by displacing the holes to regions with less variation. Additionally, the inventive method solves the blurring effect automatically, as the region with edge blurs is shifted independently of the segments. Neither depth ordering information nor information on the edge blurring is required. The remaining holes can be placed within the interior of the objects and not within the interior of the edges. Such, the hole filling can be solved easier by interpolation. By taking into account an edge region, blurred edges can be handled.

The image segmentation can group pixels into segments having similar parameters, such as similar luminance or similar color or any other similarity. Given two neighboring segments, edge regions can be defined between these segments. The edge regions can be defined such that they consist of all pixels, which are less than a certain distance, for instance five pixels, away from the boundary of the two segments.

The estimation of the displacement field can be done by any known motion estimation method. Motion estimation methods typically try several candidate motion (displacements) vectors, and select the one, which results in the best match. The inventive method provides finding motion vectors for each segments as defined by the segmentation, as well as a motion vector of the edge region, which may, or may not, be the same as the motion vector of one of its originating segments, thus providing at least two different displacement fields.

According to the inventive method, the two segments and the edge region are treated as three independent objects. Hence, two holes, one between a first segment and the edge region and one between the edge region and a second segment can be created instead of only one hole. These two holes each may be smaller than one single hole, thus making interpolation easier. As the blurring of the edge is displaced within the edge region, as if it where a single object, there is no need to do deblurring/reblurring or estimating the amount of blur. The two holes between the segments and the edge regions are in homogenous parts of the segments and hence are easy to fill.

In contrast to known segment extension, the inventive method does not require the edge to have the same displacement as one of the objects, making the inventive method more robust to errors in the estimation of the displacement field. Depth ordering is not required. However, the motion vector of the edge can give a clue to the depth ordering.

The inventive method is applicable for rendering data suitable for 3D display. Furthermore, video compression methods relying on shift-based rendering may become more robust due to the inventive method.

Hole filling according to claims 2 and 3 is provided. This hole filling can rely on the pixel values of the bordering pixels at each side of the edge region. The hole filling can be carried out in a region not directly belonging to the edge. By simple extrapolating the pixel values of the segments at the border to the hole, the hole can be filled.

The edges can be determined by the boundaries between the image segments according to claim 4.

Embodiments according to claim 5 also provide determining edge regions by assigning to each edge all pixels, which are closer to said edge than a threshold number of pixels. It is also possible to determine the edge region such that a sufficient extension to both sides of the edge is provided, or to determine the edge region such that it extends sufficiently wide perpendicular to both sides of the edge.

In order to have the edge blurring within the edge region, features of claim 5 or 6 are provided. Taking the region around the boundary into account can be essential to handle blurred edges. Insofar, the edge and its blur are handled as a separate object and shifted accordingly.

For determining the first and the second displacement fields, the 2.5D depth information can be used according to claim 7 or 8. This information can be used to generate the first displacement field and possibly the second as well. Furthermore, the image segmentation can be done on depth information instead of the image itself. In this way, the displacement fields can be calculated from an external source, in contrast to calculating it by motion estimation. With a given a 2.5D stream which comprises image and depth, the displacement can be derived from the depth, and image segmentation can either be based on depth or on image.

Motion estimation for determining the displacement of the first and the second displacement fields are provided according to claim 9.

To provide holes between the edge region and the segments, which each are smaller than one single hole, a method according to claim 11 is provided. The second displacement field can have displacement values, which are between the displacement values of one of the segments. Displacement is a 2D quantity with x- and y-displacement.

Shifting of the pixels can be carried out by taking for at least parts of pixels in the edge region the displacements from the second displacement field and for all other pixels the displacement from the first displacement field.

The motion estimation can be directly carried out on the segments and the edge regions and therefore the third displacement field can be calculated directly according to claim 13.

In case the first pixels of the primary segment are shifted and subsequently the pixels of the edge regions are shifted, occluding regions can be handled adequately according to claim 14.

These and other advantages can also result from the other dependent claims.

Another aspect of the invention is a system arranged for providing rendered images based on image segmentation comprising determination means arranged to determine an edge within the image introduced by boundaries of image segments, to determine an edge region around the edge, to determine a first displacement field for the segments, and to determine a second displacement field for the edge region, merging means arranged to merge the first and the second displacement field into a third displacement field having a displacement of the first displacement field for the segments and a displacement of the second displacement field for the edge region, such that the edge region is treated as a separate object with a separate displacement, and shifting means arranged to shift the image pixels according to the third displacement field.

Yet, a further aspect of the invention is a computer program and a computer program product for providing rendered images based on image segmentation operable to cause a processor to determine an edge within the image introduced by boundaries of image segments, determine an edge region around the edge, determine a first displacement field for the segments, determine a second displacement field for the edge region, merge the first and the second displacement field into a third displacement field having a displacement of the first displacement field for the segments and a displacement of the second displacement field for the edge region, such that the edge region is treated as a separate object with a separate displacement, and shift the image pixels according to the third displacement field.

These and other aspects of the invention will be apparent from and elucidated with reference to the following Figures. In the Figures show:

FIG. 1 a segmented image;

FIG. 2 a hole filling schemes for image segmentation;

FIG. 3 a hole filling with deblurring;

FIG. 4 an image segmentation and shifting according to an inventive method;

FIG. 5 a close-up of an edge region being segmented and shifted according to an inventive method.

Throughout the Figures, same reference numbers refer to similar elements. The inventive method particular relates to shift-based rendering, for instance used in compression algorithms or in rendering "image+depth" data on multi-view displays. The inventive method particular provides an automatic approach for rendering images based on image segmentation.

FIG. 1 illustrates an image comprising segments 4 being determined by boundaries 2. The boundaries 2 are edges, which can be determined from image discontinuities, for instance discontinuities in color variation or, when available, discontinuities in a displacement field of given displacement or disparity data of a 2.5D image . Other discontinuities are also possible, such as within luminance, contrast, brightness, chrominance or any other value.

Figure 2A:
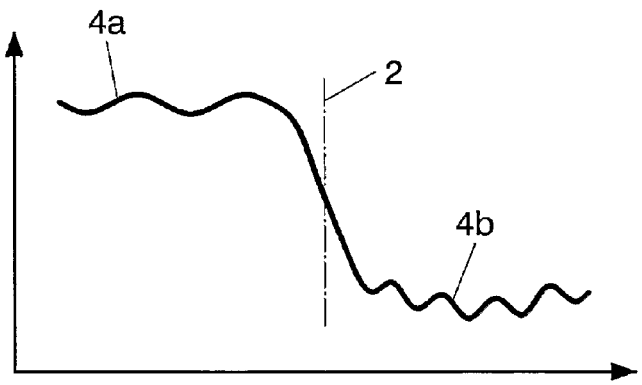

FIG. 2a shows schematically an illustration of a cross view through an image. The horizontal axis can be interpreted as the co-ordinate of the scan-line, and the vertical axis can be interpreted as the luminance value of the image on the respective scan-line. As depicted in FIG. 2, the scan-line has a discontinuity in the luminance value and the image can be segmented into a left segment 4a and a right segment 4b divided by an edge 2, which can be blurred.

For providing shifting the segments by a motion vector (not depicted), the segments 4a, 4b can be cut into two separate segments through edge 2. Edge 2 is determined by the boundary between the segments 4a and 4b.

Figure 2B:
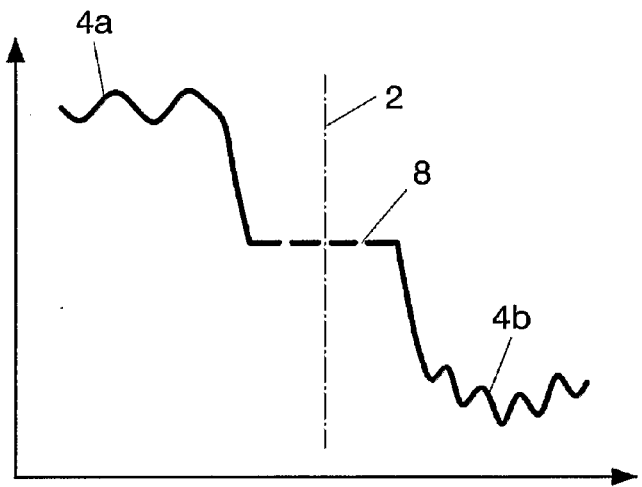

Illustrated in FIG. 2b is a linear interpolating hole filling scheme. The left segment 4a is shifted to the left and the right segment 4b is shifted to the right beginning from the edge 2. The hole filling 8 is a linear interpolation between the values of the left segment 4a and the right segment 4b at the edge 2. This interpolation results in an image with edges which have a constant value in their middle. This can result visually in a much more blurred edges and undesired artifacts.

Figure 2C:
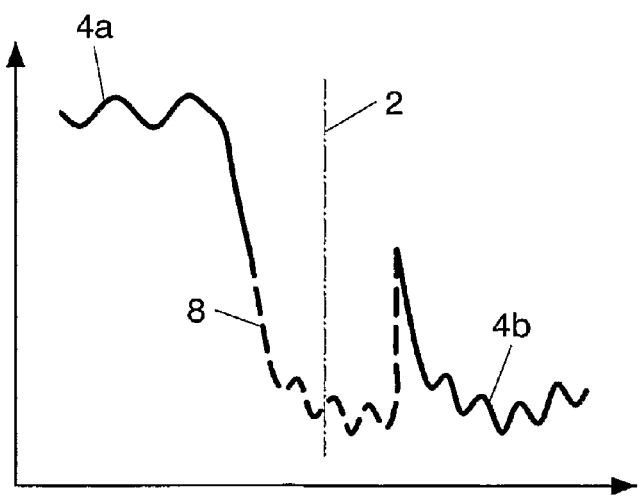

FIG. 2c illustrates a hole filling scheme which provides copying the luminance value from the right segment 4b into the hole, which provides a ghost edge. As can be seen, the luminance value of the right segment 4b is a copied into the hole, providing hole filling 8. This can also lead to visual artifacts.

Figure 3A:
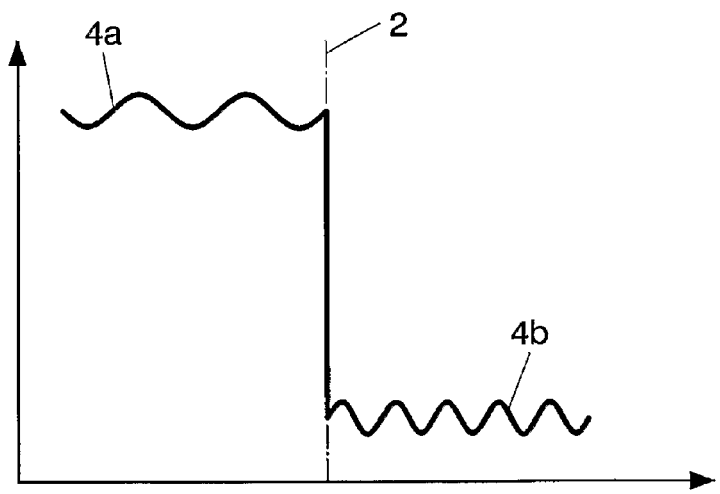
Figure 3B:
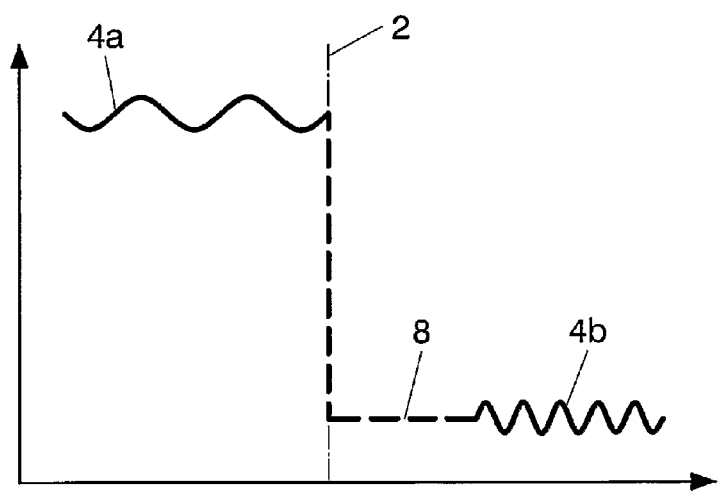

FIG. 3a illustrates schematically a hole filling scheme according to the subject matter as described in WO 02/51124. This approach first provides shifting the right segment 4b by a displacement vector. First, the segments 4a and 4b are deblurred, proving a step edge 2. Then, segment 4b is shifted by a displacement vector, as depicted in FIG. 3b.

Figure 3C:
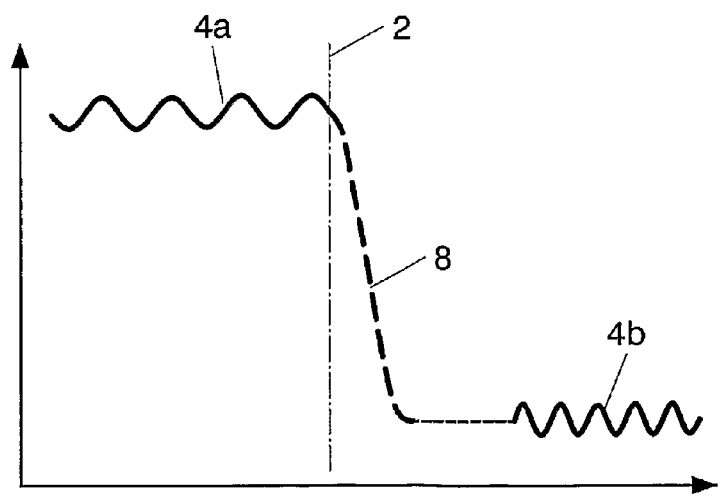

Finally, as illustrated in FIG. 3c, the edge 2 is reblurred and the reblurred hole filling 8 is applied. This reblurring takes place using an estimated blur radius. However, estimating the blur radius is complicated and may lead to wrong results. Additionally, it is required to know what is the depth ordering of the objects, as only this allows reblurring correctly.

Figure 4A:
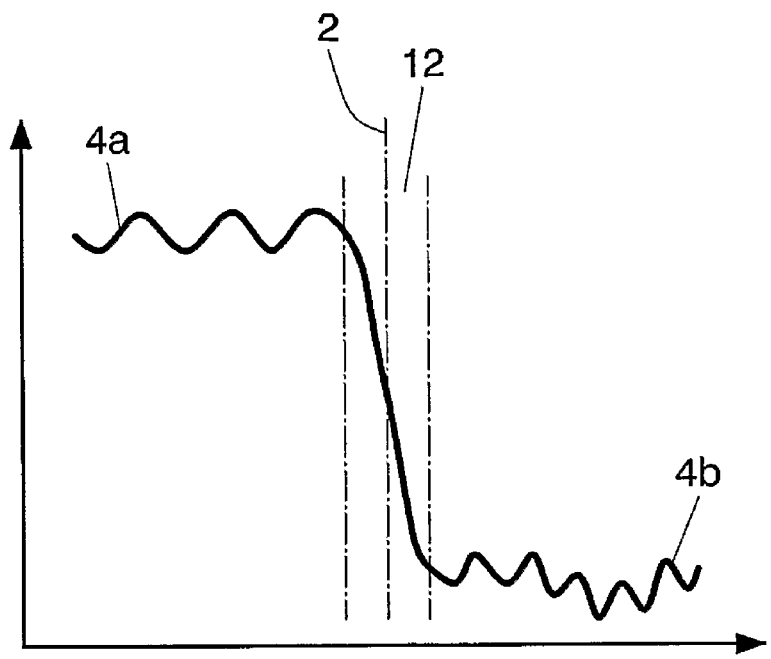

FIG. 4a depicts segmenting an image according to an inventive embodiment. Around an edge 2, an edge region 12 is determined, which comprises the blurred region around the edge 2. Besides the edge region 12, segments 4a and 4b are determined. The edge region 12 is considered as a separate object with a separate displacement.

Figure 4B:
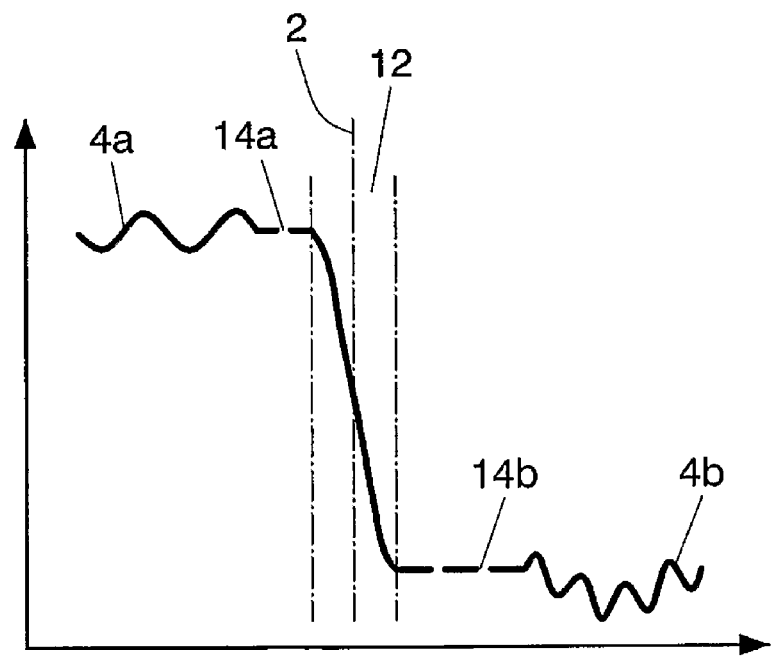

In FIG. 4b the image is illustrated after shifting. As can be seen, segment 4a is shifted to the left according to a first displacement vector. Edge region 12 is shifted to the left according to a second displacement vector, which is smaller than the first displacement vector, and segment 4b is shifted to the right according to a third displacement vector. By shifting the edge region 12 independently of the segments 4a and 4b, two separate holes are provided, which can be filled with hole filling 14a, 14b. The blurring is resolved automatically as the edge blur itself is shifted, and depth ordering information is not required. The two holes are in the homogenous parts of the segments 4a, 4b and hence are easy to fill. Further, each hole can be smaller than one single hole as in the methods according to FIG. 2 and FIG. 3. This can make interpolation easier. As the edge region is not to be displaced by the same displacement vector as one of the segments 4a, 4b, the proposed method is more robust to errors in the estimation of the displacement field.

Figure 5A:
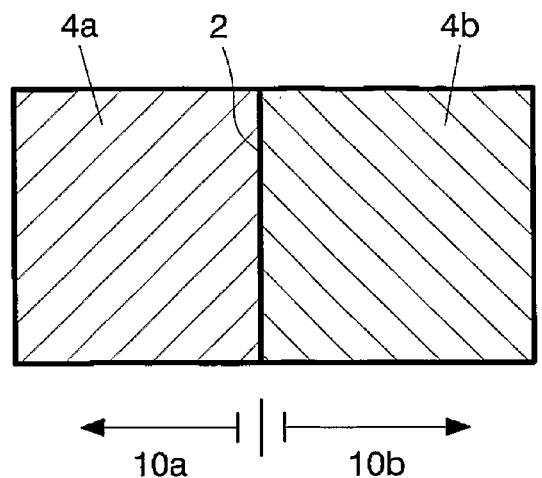

FIG. 5a illustrates a close-up of an image, where two segments 4a, 4b are separated by an edge 2. Further, displacement vectors 10a, and 10b for the respective segments 4a, 4b are shown in FIG. 5a.

Figure 5B:
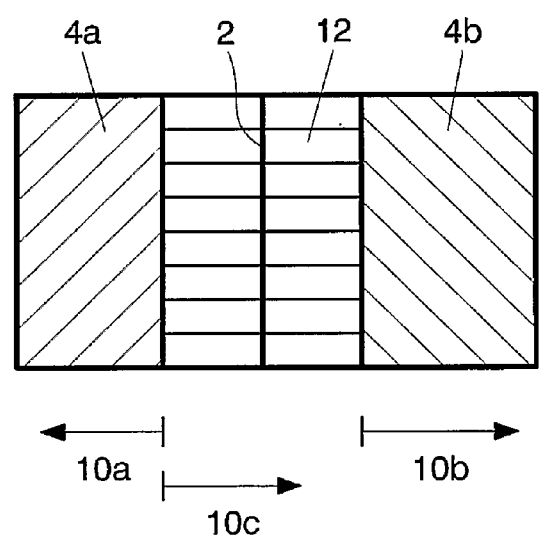

In FIG. 5b it is shown that the edge 2 is circumferenced by an edge region 12, taking edge blurring into account. The edge region 12 is chosen such that the edge blur is within this region. Further illustrated in FIG. 5b are displacement vectors 10a, and 10b as in FIG. 5a as well as a further displacement vector 10c indicating a displacement of edge region 12. These displacement vectors 10 can be expressed within a displacement field, indicating for each region within the image a particular displacement.

Figure 5C:
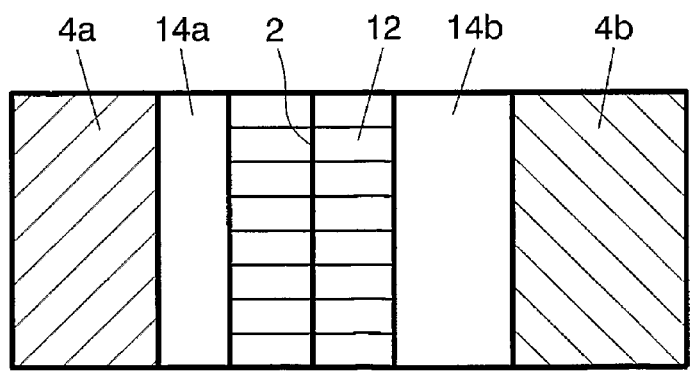

FIG. 5c illustrates the image after shifting according to the inventive method. Segment 4a is shifted to the left according to displacement vector 10a. Edge region 12 is shifted to the right according to displacement vector 10c and segment 4b is shifted to the right according to displacement vector 10b. These three different displacement vectors 10 result in shifting the edge region 12 such that holes are provided between segment 4a, edge region 12 as well as between segment 4b and edge region 12. These holes can be filled with hole filling 14a, 14b.

The inventive method allows segmenting and rendering images and filling resulting holes easily without the need of deblurring or reblurring. Further, errors due to the hole filling are minimized.

The invention claimed is:

1. A method for providing rendered images based on image segmentation via a processor programmed via a computer readable medium embodied with a computer program to cause the processor to carry out the method comprising:

determining, via the processor, an edge within an image introduced by boundaries of image segments;

determining, via the processor, an edge region around the edge, wherein the edge region takes edge blurring into account;

determining, via the processor, a first displacement field for the image segments;

determining, via the processor, a second displacement field for the edge region;

merging, via the processor, the first and the second displacement field into a third displacement field, wherein the third displacement field having (i) a displacement of the first displacement field for the image segments and (ii) a displacement of the second displacement field for the edge region, such that (iii) the edge region is treated as a separate object with a separate displacement, the edge region being separate from the image segments; and shifting, via the processor, respective image pixels within the image according to the third displacement field, wherein the edge region is shifted independently of the image segments, and wherein the shifting creates holes in homogeneous parts of the image segments in regions not directly belonging to the edge.

2. The method of claim 1, further comprising:

filling, via the processor, the holes, created after having shifted the image pixels, with pixel values.

3. The method of claim 2, further comprising:

calculating, via the processor, the pixel values for hole filling (i) from pixel values of pixels bordering the holes from at least one of the image segments or (ii) from pixel values of pixels from the edge region bordering the holes.

4. The method of claim 1, wherein determining the edge comprises determining the edge by detecting boundaries between image segments.

5. The method of claim 1, wherein determining the edge region comprises determining the edge region by assigning to each edge all pixels which are closer to said edge than a threshold number of pixels.

6. The method of claim 1, wherein determining the edge region comprises determining the edge region such that edge blur lies within the edge region.

7. The method of claim 1, further comprising:

providing a two-and-a-half dimensional (2.5D) image plus depth data signal, the 2.5D image plus depth data signal including an original image information signal and (ii) an original depth information signal for shift based rendering of images based on image segmentation.

8. The method of claim 7, with detecting discontinuities within the depth information of the two-and-a-half dimensional image plus depth data signal for use in determining the first and/or the second displacement field.

9. The method of claim 1, wherein determining the first and/or the second displacement field includes determining the first and/or second displacement field from motion estimation of the image segments and/or the edge regions.

10. The method of claim 1, wherein determining the second displacement field includes determining the second displacement field such that only pixels within the edge region have a displacement.

11. The method of claim 1, wherein determining the second displacement field includes determining the second displacement field such that the displacement has a value that is between the displacement values of the two corresponding image segments 12. The method of claim 1, wherein determining the third displacement field includes determining the third displacement field by taking (i) for at least parts of pixels in the edge region, the displacements from the second displacement field and (ii) for all other pixels, the displacement from the first displacement field.

13. The method of claim 1, wherein determining the third displacement field includes determining the third displacement field directly by motion estimation of the image segments and the edge region.

14. The method of claim 1, wherein shifting the pixels according to the third displacement field includes shifting the pixels such that the image segments are shifted first, prior to shifting the edge region.

15. A system arranged for providing rendered images based on image segmentation comprising:
   a processor; and
   a computer readable medium embodying a computer program operable to cause the processor to implement:
   determining an edge within the image introduced by boundaries of image segments, to determine an edge region around the edge, wherein the edge region takes edge blurring into account, to determine a first displacement field for the image segments, and to determine a second displacement field for the edge region;
   merging the first and the second displacement field into a third displacement field, wherein the third displacement field having (i) a displacement of the first displacement field for the segments and (ii) a displacement of the second displacement field for the edge region, such that (iii) the edge region is treated as a separate object with a separate displacement, the edge region being separate from the image segments; and
   shifting respective image pixels according to the third displacement field, wherein the edge region is shifted independently of the image segments, and wherein the shifting creates holes in homogeneous parts of the image segments in regions not directly belonging to the edge.

16. A computer readable medium embodied with a computer program for providing rendered images based on image segmentation, the computer program being operable when executed to cause a processor to:
   determine an edge within an image introduced by boundaries of image segments;
   determine an edge region around the edge, wherein the edge region takes edge blurring into account;
   determine a first displacement field for the image segments;
   determine a second displacement field for the edge region;
   merge the first and the second displacement field into a third displacement field, wherein the third displacement field having (i) a displacement of the first displacement field for the image segments and (ii) a displacement of the second displacement field for the edge region, such that (iii) the edge region is treated as a separate object with a separate displacement, the edge region being separate from the image segments; and
   shift respective image pixels within the image according to the third displacement field, wherein the edge region is shifted independently of the image segments, and wherein the shifting creates holes in homogeneous parts of the image segments in regions not directly belonging to the edge.

* * * * *